Oct. 31, 1967 G. H. TWICKLER 3,350,252
STRUCTURE AND MANUFACTURE OF BOWLING BALLS
Filed May 11, 1964 4 Sheets-Sheet 1

INVENTOR.
GEORGE H. TWICKLER
BY Morse & Altman
ATTORNEYS

Oct. 31, 1967  G. H. TWICKLER  3,350,252
STRUCTURE AND MANUFACTURE OF BOWLING BALLS
Filed May 11, 1964  4 Sheets-Sheet 2

INVENTOR.
GEORGE H. TWICKLER
BY Morse & Altman
ATTORNEYS

Oct. 31, 1967   G. H. TWICKLER   3,350,252
STRUCTURE AND MANUFACTURE OF BOWLING BALLS
Filed May 11, 1964   4 Sheets-Sheet 3

INVENTOR.
GEORGE H. TWICKLER
BY Morse & Altman
ATTORNEYS

Oct. 31, 1967 G. H. TWICKLER 3,350,252
STRUCTURE AND MANUFACTURE OF BOWLING BALLS
Filed May 11, 1964 4 Sheets-Sheet 4

INVENTOR.
GEORGE H. TWICKLER
BY
*Morse + Altman*
ATTORNEYS

United States Patent Office 3,350,252
Patented Oct. 31, 1967

3,350,252
STRUCTURE AND MANUFACTURE OF BOWLING BALLS
George Herman Twickler, Needham, Mass., assignor to Stowe-Woodward, Inc., Newton Upper Falls, Mass., a corporation of Massachusetts
Filed May 11, 1964, Ser. No. 366,364
6 Claims. (Cl. 156—228)

The present invention relates to the structure and manufacture of bowling balls and, more particularly, to a novel bowling ball that is characterized by a simplified and strengthened assemblage of components and to a novel molding process, advantageously applicable to the production of bowling balls, that is characterized by reduced cost and improved standardization.

The specifications of bowling balls ordinarily are in conformity with official regulations. In the game of ten pins, the circumference of the ball is constant for different weights, finger holes being provided for the reception of the thumb, middle and ring fingers. Generally, a bowling ball of the foregoing type includes a spherical outer veneer which is capable of resisting continued abrasion during play, a spherical core having a density that is selected as a function of the particular weight of the ball and a so-called top weight insert in the form of a dense mass in the vicinity of the finger holes to compensate for the removal of material from this vicinity when the holes are drilled. In conformity with official regulations, the ball must be balanced within certain limits, i.e. the centroid of mass must be approximately coincident with the center of geometry. In manufacturing such balls of different selected weights, difficulties have been encountered in accurately and reproducably determining the relative densities and positions of the veneer, core and top weight insert and in reliably and tenaciously producing shockproof bonding among the veneer, core and top weight insert.

Primary objects of the present invention are to improve the simplicity and reliability of the mechanical structure and chemical composition in a bowling ball of the foregoing type by eliminating the heavy conventional top weight insert at the location of the finger holes and by substituting a novel light "negative top weight" insert at an opposed location. Preferably, the light insert, which may be inherently weak from a structural standpoint, is enclosed by and protected within the remainder of the ball. The size of the light insert is selected as a function of overall weight in order to avoid varying chemical formulation, which is a source of inconvenience, and weakened mechanical strength, which often results. The amount of top weight is selected as a function of the insert position in order to avoid the customary complexity of reducing core weight by blending therein a light weight filler material in an effort to maintain preselected overall weight notwithstanding the presence of a dense top weight insert.

Another object of the present invention is to provide a novel molding process, advantageously adapted to the manufacture of a bowling ball of the foregoing type, in which a rigid preshaped inner portion is positioned within sections of an uncured preshaped outer portion to provide an integrated preshaped assemblage for curing. As applied to the production of a bowling ball of the foregoing type, the precise shape of the outer portion constitutes a shell having a spherical exterior about a major center and a spherical interior about an eccentric center. When a spherical insert composed of a solid cellular material is confined within the spherical interior of the shell and the integrated assemblage is cured under heat and pressure, tenacious bonding occurs at the shell-insert interface.

Other objects of the present invention will in part be obvious and will in part appear hereinafter.

The invention accordingly comprises the products and processes involving the components and steps exemplified in the following detailed disclosure, the scope of which will be indicated in the appended claims. For a fuller understanding of the nature and objects of the present invention, reference should be had to the following detailed description, taken in connection with the accompanying drawing, wherein:

Figure 1:
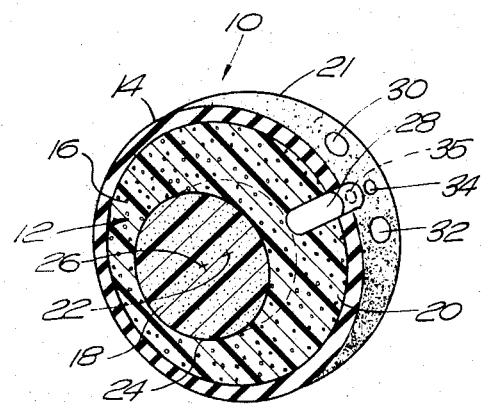
FIG. 1 is a partly sectional, cut-open, perspective view of a preferred bowling ball embodying the present invention.

Generally, the illustrative bowling ball 10 of FIG. 1 comprises a shell portion 12, including a hollow veneer 14 and a hollow core 16, and an insert portion 18 bonded within hollow core 16. Spherical interface 20 between veneer 14 and core 16 and spherical periphery 21 are developed about the major center 22 of ball 10. Spherical interface 24 between core 16 and insert 18 is developed about an eccentric center 26 that is spaced from major center 22. Thumb, middle finger and ring finger holes 28, 30 and 32 are drilled at the apices of a triangle in the vicinity of an indicium 34, which indicates the effective top weight position before the holes are drilled. Indicium 34 and eccentric center 26 lie on a straight line through major center 22 and opposite sides thereof. Also on this line is an indicium 35 at interface 20 serving to orient core 16 with indicium 34 during manufacture of the ball. As will be indicated in detail below, veneer 14 and core 16 are composed of relatively heavy natural or synthetic, shock absorbing polymers and insert 18 is composed of a relatively light cellular solid, in spherical or other form. For the game of ten pins, the circumference of the ball is fixed at 27 inches and the weight of the ball ranges from 6 to 16 pounds. The weight selected within this range is determined by the ratio of the volume of insert 18 to the combined volume of veneer 14 and core 16. The effective top weight of the ball is determined by the distance of eccentric center 26 from major center 22.

Figure 2:
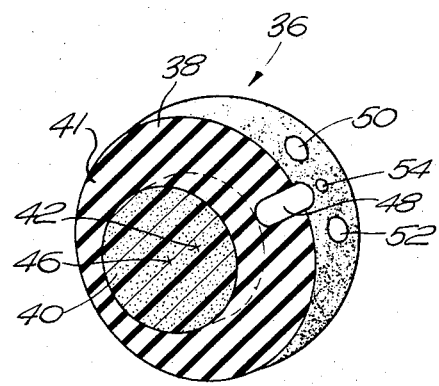
FIG. 2 is a partly sectional, cut-open perspective view of an alternative bowling ball embodying the present invention.

Generally, the illustrative bowling ball 36 of FIG. 2 comprises a shell portion 38 and an insert portion 40. The spherical external periphery 41 of shell portion 38 is developed about major center 42 of the ball and the spherical interface 44 between shell portion 38 and insert portion 40 is developed about an eccentric center 46 that is spaced from major center 42. Thumb, middle finger and ring finger holes 48, 50 and 52 are drilled at the apices of a triangle located at a position marked by an indicium 54. As will be indicated in detail below, shell portion 38 is composed of a relatively heavy natural or synthetic, shock absorbing polymer and insert portion 40 is composed of a relatively light cellular solid. For the game of ten pins, the circumference of the ball is fixed at 27 inches and the weight of the ball ranges from 6 to 16 pounds. The weight selected in this range is determined by the ratio of the volume of insert portion 40 to the volume of shell portion 38 and the effective top weight is determined by the distance between eccentric center 46 and major center 42.

Generally, the composition of shell portion 12, including veneer 14 and core 16, and shell portion 38, of FIGS. 1 and 2 as indicated above, consists of one or more of a wide variety of natural and synthetic polymers. In one form, this composition is a natural rubber such as cis-1,4- polyisoprene or a synthetic rubber such as butadiene-styrene, neoprene, butyl rubber, nitrile rubber, polysulfide rubber, chlorosulfonated polyethylene, polyurethane, cis-1,4-polybutadiene, synthetic cis-1,4-polyisoprene, adduct rubber and combinations thereof. Curing of these materials is effected at elevated temperatures by suitable chemical agents such as sulfur, selenium, tellurium, organic peroxides, nitro compounds, azo compounds and certain organic sulfur compounds such as the alkali disulfides. Alternatively, this composition consists of a synthetic plastic containing as characteristic ingredients, an acrylic polymer and a polyester resin. Generally, the acrylic polymer is formed by the polymerization of a monomeric derivative, generally an ester or an amide of an acryllic acid, typical examples being methyl methacrylate, ethyl methacrylate, methyl ethyl methacrylate, dibutylene dimethacrylate and mixtures, copolymers and interpolymers thereof. Generally, the polyester resin is formed by an esterification reaction between a polyacid and a polyalcohol, typically a saturated dibasic acid (such as adipic acid and an unsaturated dibasic acid such as maleic acid, in major and minor proportions, respectively,) and a glycol such as diethylene glycol. Preferably, by total weight of the composition, the polyester ranges from 5 to 95% and the acrylic ranges from 5 to 95% and the acrylic ranges from 95% to 5%. Best results are obtained when, by total weight of the composition, the polyester ranges from 55% to 65% particularly when the polyester is approximately 60% and when the acrylic ranges from 45% to 35%, particularly when the acrylic is approximately 40%.

Generally, insert portions 18 and 40 are composed of a relatively low specific gravity material of high dimensional stability, particularly a synthetic or natural cellular material. Most broadly the present invention encompasses the use of a natural cellular material such as wood or cork wherein the dead cells of plant tissue are filled with air, for example, as chips in a suitable binder. However, best results are obtained with synthetic solid foams, pre-formed in selected sizes, including: urethane foams, for example, polyurethane foams of the type prepared by reacting a polyisocyanate such as tolylene diisocyanate with a polyhydroxyl compound (polyols, glycols, polyesters and polyethers) such as polypropylene ether glycol in the presence of a catalyst, particularly tertiary amines and tin salts, such as tetramethylbutanediamine, triethylenediamine, stannous octoate and dibutyl tin dilaurate, a cell control agent such as polyglycolsilicon polymer and a blowing agent such as water, $CCl_3F$, $CCl_2F_2$ and combinations thereof; polystyrene foams such as that prepared by dispersing liquid styrene, a foaming agent, particularly a hydrocarbon such as pentane, hexane and heptane, and suitable polymerization catalyst in an aqueous medium with agitation, heating with agitation for several hours until the styrene is essentially completely polymerized to a high molecular weight, washing from the resulting intermediate all polymerization agents and then expanding at elevated temperatures, epoxy foams formed by condensing bisphenol and epichlorohydrin in the presence of a curing agent, for example, a polyamine such as diethylene triamine and triethylenetetramine, and a suitable blowing agent; polyvinyl chloride foams of the type formed by the dissolution under pressure (e.g. 300 atmospheres) of gas in polyvinyl chloride to form a paste in a pressure vessel, cooling the fused mass, removing the fused mass from the mold and thereafter expanding the fused mass under heat; phenolic resin foams of the type formed by the condensation of phenol and formaldehyde in the presence of a catalyst, for example a mineral acid such as hydrochloric, sulfuric and phosphoric or an aromatic acid such as benzenesulfonic, toluenesulfonic and phenolsulfonic, and a gas liberating agent, for example, carbonate salts of sodium, potassium, ammonium, calcium and magnesium; urea-formaldehyde foams, for example, composed of a polymer produced by the condensation of urea and formaldehyde in the presence of a suitable catalyst and a suitable blowing agent; silicon foams, particularly, polyorganosiloxanes which are polymerized and foamed in the presence of a suitable catalyst and a suitable blowing agent; syntactic foams (of the type sold by Standard Oil under the trade designation Microballons) for example, formed by subdividing into droplets a solution containing a volatile solvent having dissolved therein a film forming material and a gas liberating material, and by heating the droplets to a temperature at which film formation and gas liberation create gas filled particles, the film forming material, for example, being either polyvinyl alcohol or phenol formaldehyde, the gas liberating material, for example, being dinitrosopentamethylene tetramine, ammonium nitrate, ammonium carbonate or ammonium bicarbonate, and the resulting particles having an approximate diameter of 1 to 500 microns, an approximate specific density of from 0.01 to 0.3 and an approximate liquid displacement of 0.05 to 0.06; cellulose acetate foams of the type in which cellulose acetate is dissolved at least partially in acetone and ethyl alcohol and thereafter expanded under heat; rigid acrylic foams of the type in which alpha-chloro acrylic acid ester polymers are heated in such a way that the polymer decomposes in part to yield an alkyl chloride foaming agent; and polyester solid foams which are polymerized and expanded when residual carboxyl and hydroxyl end groups react with diisocyanates in the presence of a suitable polymerization catalyst and a suitable blowing agent.

Figure 3A:
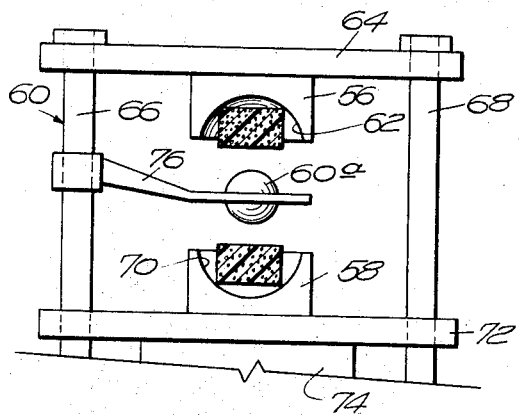
FIG. 3 illustrates the steps of a process in which selected materials are subjected to selected steps in accordance with the present invention.
Figure 3B:
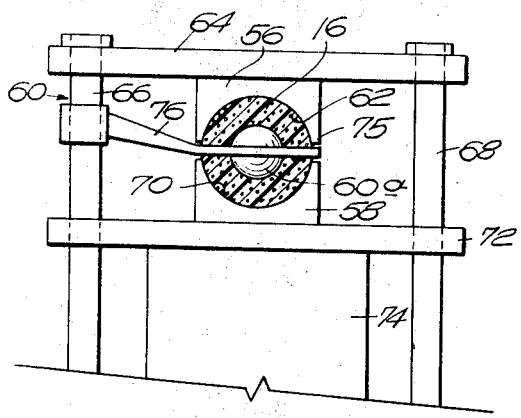

The process of the present invention will be illustrated in connection with the manufacture of the preferred product of FIG. 1. As shown in FIG. 3(a), initially material for the production of core 16 is precisely shaped by die components 56, 58 and 60. Die component 56, which provides an internal, hemispherically shaped surface 62, is fixed to a crosspiece 64 that is supported by vertically upstanding rods 66, 68. Die component 58, which provides an internal, hemispherically shaped surface 70, is fixed to a crosspiece 72, which rides along rods 66, 68 via openings through which the rods project. Crosspiece 72 is pressed upwardly by a suitable drive and ram 74. Die component 60 is mounted on an arm 76 that is both pivotal outwardly to and from a position between dies 56, 58 and reciprocable along rod 66. When registered between dies 56, 58 in their closest condition, the convex hemispheric surfaces of die 60 are spaced from adjacent concave hemispheric surfaces 62, 70 by a predetermined distance. When ram 74 forces die 58 into registration with die 56 in the presence of a suitable supply of core stock, as shown in FIG. 3(b), the precise shape of core 16 is determined. Excess core composition escapes from the mold through suitable vents 75.

Figure 3C:
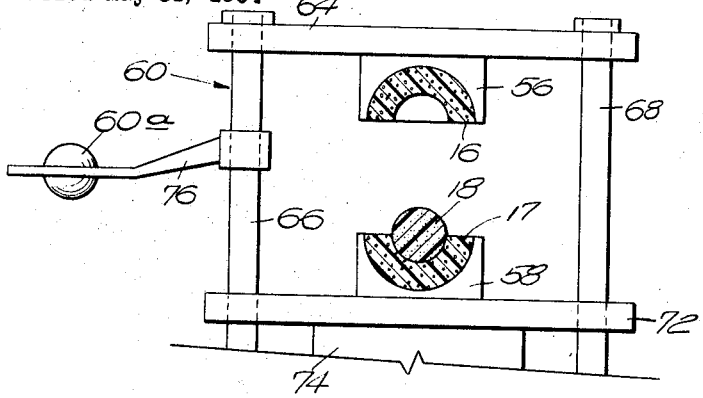
Figure 3D:
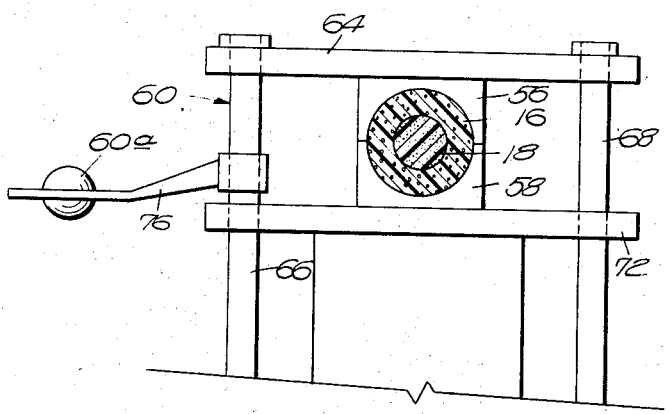
Figure 3E:
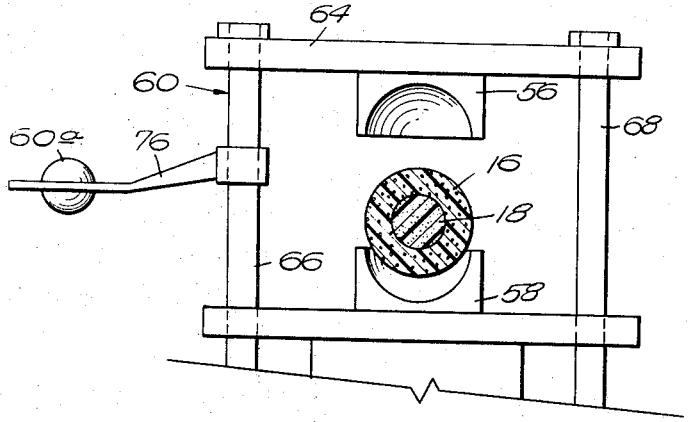

Next, as shown in FIG. 3(c) and with the sections of core 16 remaining in their unpolymerized condition, die components 56, 58 are removed from each other and die component 60 is pivoted out from the position therebetween. Next, solid, cellular insert 18 is fitted into the cavity defined by the two parts of core 16 and, as shown in FIG. 3(d), the adjoining edges of the core parts are pressed into adherence with each other. While the core is in the position shown in FIG. 3(d) indicium 35, is applied at the outer core surface. As explained in connection with FIG. 1, this indicium lies on a line that passes through major center 22 and eccentric center 26. Next, as shown in FIG. 3(e), the subassemblage, including insert 18 and core 16, is removed from the mold for insertion in the veneer.

Figure 3F:
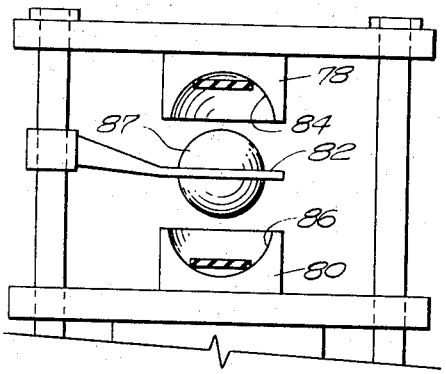
Figure 3G:
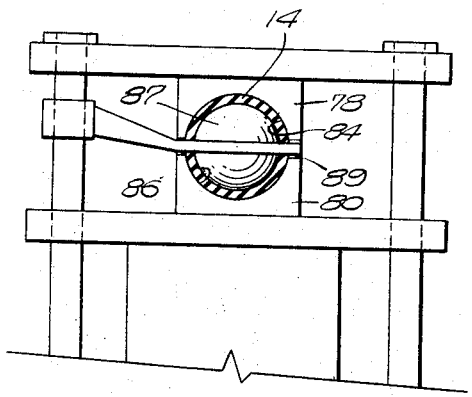
Figure 3H:
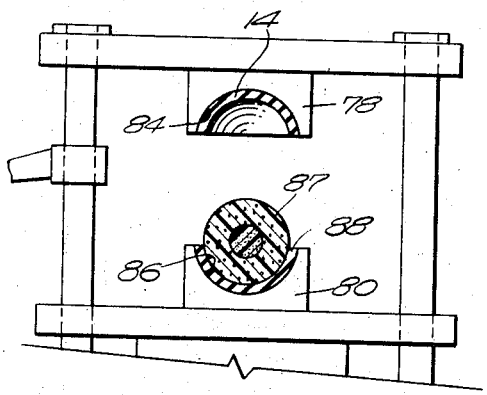
Figure 3I:
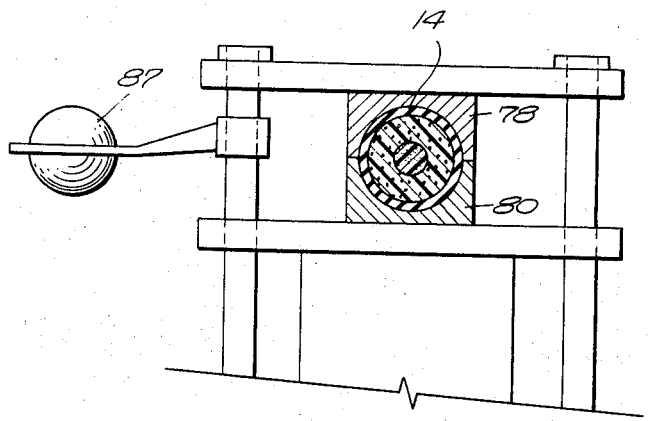
Figure 3J:
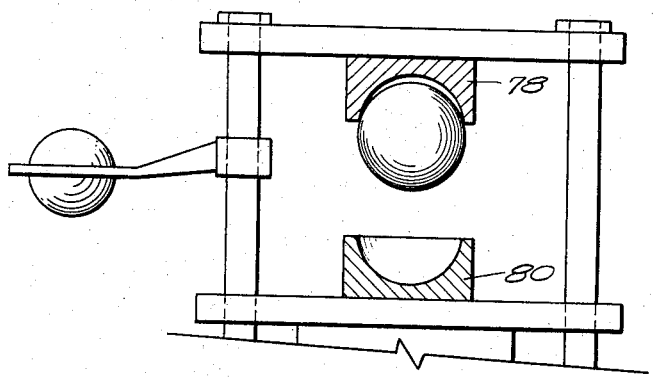
Figure 3K:
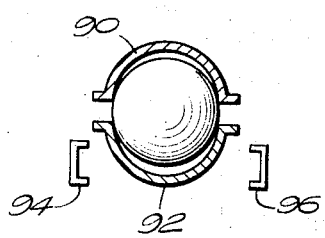

Veneer 14 is formed as in FIGS. 3(f) and (g) by die components 78, 80 and 82, die component 78 being mounted in the manner of die component 56, die component 80 being mounted in the manner of die component 58 and die component 82 being mounted in the manner of die component 60. The concave, hemispherical surface of die component 78 is designated 84, the concave, hemispherical surface of die component 80 is designated 86 and the convex, hemispherical surfaces of die component 82 are designated 87. The diameter of the sphere defined by convex surface 87 is predeterminedly smaller than the diameter of spherical surface 84, 86 by an amount equal to the thickness of veneer 14. Excess veneer composition escapes through vents 89. Next, die components 78, 80 and consequently the two halves of veneer 14, are separated and, as shown in FIG. 3(h), insert and core subassemblage 16, 18 is positioned with its marker 35 aligned with marker 34, at the exterior of the veneer. Then, with die component 82 out of the way as shown in FIG. 3(i), the halves of veneer 14 are pressed together about the subassemblage. Finally, as shown in FIG. 3(j), completed assemblage of insert, core and veneer is positioned within a mold 90, 92, which after being fastened by clips 94, 96, is heated for the period necessary in which to convert the completed assemblage into an integrated polymerized mass of spherical shape.

The following non-limiting examples will further illustrate the present invention.

*Example I*

A preferred process of FIG. 3 is performed as follows. A core was prepared, as in FIGS. 3(a) and (b), from a composition consisting of unvulcanized natural hard rubber containing an amount of sulfur necessary for vulcanization. The outside diameter of the core was approximately 8.09 inches. The inside diameter of the core cavity was approximately 3.40 inches and the eccentric center of the core cavity was displaced from the major center of the core periphery by approximately 0.75 inch. A rigid foam core, approximately 3.40 inches in diameter, was produced from the following under conventional heat and pressure: polypropylene ether glycol-100.00 parts; silicone surfactant-0.25-part; triethylamine-0.42 part; tolylene diisocyanate-117.00 parts; and $CCl_3F$-34.00 parts. This rigid foam core was enclosed within the core cavity as shown in FIGS. 3(c), (d) and (e). A veneer was prepared, as in FIGS. 3(f) and (g). The outside diameter of the veneer was approximately 9.09 inches and the inside diameter was approximately 8.59 inches. The composition of veneer consisted of unvulcanized natural hard rubber containing an amount of sulfur necessary for vulcanization. A one quarter inch diameter, visible marker, composed of unpolymerized hard rubber, was pressed into the core at a point indicating the top weight position. The subassemblage of core and insert was enclosed within the veneer as shown in FIGS. 3(g), (h) and (i). A one quarter inch diameter, visible marker, composed of unpolymerized hard rubber, was pressed into the veneer in registration with the corresponding marker in the subassemblage therewithin to indicate top weight position. Finally, the entire assemblage was cured at 290° F. for 24 hours within the mold of FIG. 3(j). The pressure during curing was approximately 300 pounds per square inch. The insert, which was somewhat compressible, compensated for expansion and contraction of the ball. The overall weight of the ball, 16 pounds, to a design approximation was accounted for substantially entirely by the core and the veneer. Slicing the ball in half revealed that the veneer was extremely uniform in thickness.

*Example II*

The process of Example I was repeated except that the volume of the insert was increased five times, the volume of the core was correspondingly reduced and the distance between the eccentric center and the major center was reduced to approximately 0.2 inch. The resulting ball weighed 10 pounds.

It will be appreciated that in various additional examples, the performance of which will be apparent to persons skilled in the art, any of the natural or synthetic polymers mentioned hereinabove are substituted for the natural rubber specified in Example I for the core and the veneer and any of the rigid foams mentioned hereinabove are substituted for the polyurethane specified in Example I. Preferably, the assemblages of shell portion and insert portion are cured at relatively low pressures ranging from 100 to 500 pounds per square inch in order to avoid unduly compressing the solid foam of which the insert is composed. Alternatively, the assemblages of shell portion and insert portion are cured at relatively high pressures ranging from 500 to 2000 pounds per square inch, as when the light weight insert is of a wood chip and plastic binder composition or other relatively incompressible mass.

The present invention thus provides a novel bowling ball structure of unprecedented simplicity and a novel molding process of unprecedented efficacy. Since certain changes may be made in the foregoing product and process without departing from the scope of the invention therein, it is intended that all matter contained in the above description and shown in the accompanying drawing be interpreted in an illustrative and not in a limiting sense.

What is claimed is:

1. A process of manufacturing a bowling ball, said process comprising the steps of pressing polymerizable masses of putty-like consistency between the concave spherical surfaces of a pair of first outer die means and the convex spherical surfaces of a first inner die means to produce a pair of portions of a first shell, the concave spherical surface of one of said pair of first outer die means being closer to its adjacent convex spherical surface of said first inner die means than is the concave spherical surface of the other of said pair of first outer die means to its adjacent convex spherical surface of said first inner die means so that a pair of seats are formed in said pair of portions of said first shell, the thickness of one of said portions of said first shell between its seat and its outer periphery being greater than the thickness of the other of said portions of said first shell between its seat and its outer pheriphery, withdrawing said pair of first outer die means from said first inner die means in order to release said portions of said first shell from said convex spherical surfaces of said first inner die means and with said portions of said first shell in adherence with said concave spherical surfaces of said pair of first outer die means, relatively withdrawing said first inner die means from said first pair of outer die means, intimately seating a spherical insert in said seats between said portions of said first shell, pressing said portions of said first shell into contiguity about said insert in order to enclose said insert within said shell by operation of said first pair of outer die means thereby providing a bowling ball core, pressing polymerizable masses of putty-like consistency between the concave spherical surfaces of a pair of second outer die means and the convex spherical surfaces of a second inner die means to produce a pair of portions of a second shell, the concave spherical surface of one of said pair of second outer die means being substantially the same distance from its adjacent convex spherical surface of said second inner die means as is the concave spherical surface of the other of said pair of second outer die means from its adjacent convex spherical surface of said second inner die means so that a pair of seats are formed in said pair of portions of said second shell, the thickness of one of said portions of said second shell being substantially the same as the thickness of the other of said portions of said second shell, withdrawing said pair of second outer die means from said second inner die means in order to release said portions of said second shell from said convex spherical surfaces of said second inner die means and with said portions of said second shell in adherence with said concave spherical surfaces of said pair of second outer die means, relatively withdrawing said second inner die means from said second pair of outer die means, seating said core between said portions of said second shell in said seats thereof, pressing said portions of said second shell into contiguity about said core in order to enclose said core within said second shell by operation of said second pair of outer die means thereby providing a bowling ball veneer, and heating the assemblage of said core and said veneer at a sufficiently high temperature for a sufficiently long period to polymerize said outer shell and said inner shell, said spherical insert being of a composition that is lighter than the composition of said first shell, whereby the center of said insert is displaced on one side of the center of the outer periphery of said second shell to provide the bowling ball with top weight on the other side of said center of said outer periphery.

2. The process of claim 1 wherein the center of said insert is displaced from the center of said first shell and said insert is composed of a solid foam that is lighter than the composition of said first shell.

3. The process of claim 1 wherein the composition of said first shell contains minute gas filled cells.

4. The process of claim 1 wherein the composition of said veneer is composed of a synthetic or natural polymer.

5. The process of claim 1 wherein the center of said insert is displaced from the center of said first shell and said insert is composed of a rigid solid foam that is lighter than the composition of said first shell, the composition of said first shell containing minute gas filled cells, the composition of said veneer being composed of a synthetic or natural polymer.

6. The process of claim 1 wherein the initial composition of said first shell contains unvulcanized natural or synthetic, hard rubber and sufficient sulfur for vulcanization and the initial composition of said second shell contains unvulcanized natural or synthetic, hard rubber and sufficient sulfur for vulcanization.

References Cited
UNITED STATES PATENTS

| | | | |
|---|---|---|---|
| 2,291,738 | 8/1942 | Luth et al. | 273—63 |
| 3,206,201 | 9/1965 | Hendricks | 156—228 |
| 3,248,113 | 4/1966 | Baggenstoss et al. | 273—63 |
| 3,256,018 | 6/1966 | Baggenstoss | 273—63 |

MORRIS SUSSMAN, *Primary Examiner.*

EARL M. BERGERT, *Examiner.*

W. J. VAN BALEN, *Assistant Examiner.*